S. MILLER.
GARDEN IMPLEMENT.
APPLICATION FILED MAR. 9, 1917.
1,296,202.
Patented Mar. 4, 1919.
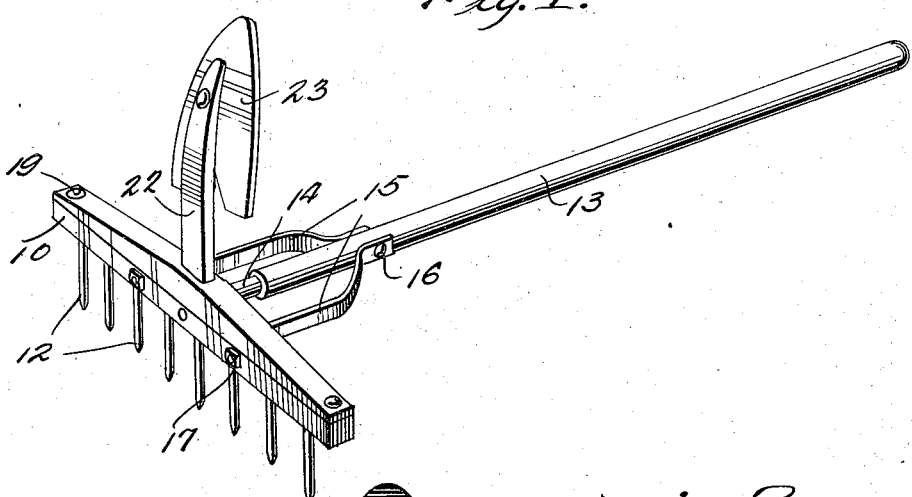
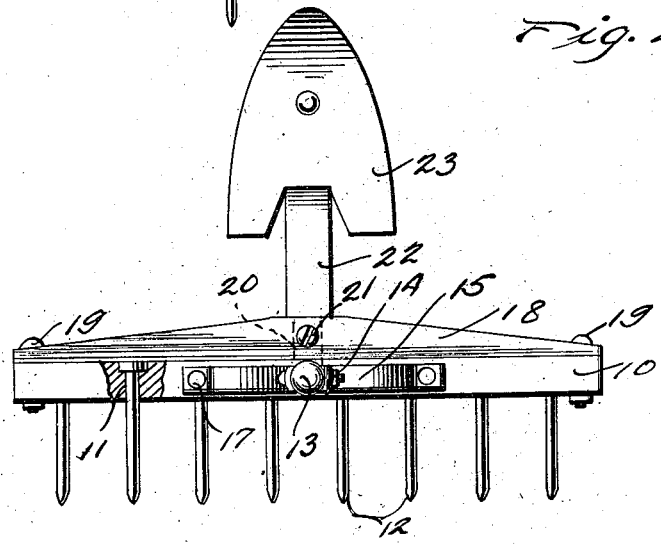
Inventor
Springs Miller

UNITED STATES PATENT OFFICE.

SPRINGS MILLER, OF CONWAY, ARKANSAS.

GARDEN IMPLEMENT.

1,296,202.  Specification of Letters Patent.  Patented Mar. 4, 1919.

Application filed March 9, 1917. Serial No. 153,636.

*To all whom it may concern:*

Be it known that I, SPRINGS MILLER, a citizen of the United States, residing at Conway, in the county of Faulkner and State of Arkansas, have invented certain new and useful Improvements in Garden Implements, of which the following is a specification.

This invention relates to an improved combination garden tool and the principal object of the invention is to provide a device of the character described so constructed that the various elements may be quickly assembled to provide implements of different characters used in gardening.

Another object of the invention is to so construct this device that it may be taken apart and the various elements packed in a small space.

Another object of the invention is to so construct this device that when in the shape of a rake, it may be converted into another implement without destroying its appearance as a rake.

This invention is illustrated in the accompanying drawings, wherein:—

Figure 1 is a perspective view of the device constructed in accordance with my invention.

Fig. 2 is an end elevation of the rake.

The section 10 or rake head is provided with a series of suitable openings 11 to receive the rake teeth 12. The handle 13 has one end thereof reduced to provide a pin 14 which extends through the section 10 at right angles to the teeth 12. This handle is secured to the section 10 by suitable braces 14 which engage opposite sides of the handle at one end and are secured thereto by a fastening member 16. The opposite ends of these braces are bent to lie flat against one side of the section 10 and are secured as indicated at 17.

A carrier bar 18 corresponding in length and width to the section 10 is secured to one side of said section by means of suitable fastening members 19 and is provided intermediate its length with a socket 20. In this socket is received the reduced end 21 of an arm 22 carried by the ferrule opening blade 23. This arm is retained in operative relation with the rake section 10 through the medium of a fastening member 24 extending into the socket and engaging the reduced end 21 of the arm to secure the same.

From the foregoing it will be evident that I have provided an improved form of rake which may be readily converted into a furrow forming tool without interfering with the use of the tool as a rake. In removing the furrow opening blade from the section 10, the carrier bar 18 may be separated from the section 10 or the arm 22 of the blade may be merely withdrawn from the socket 20 of said bar without separating the latter from the rake section.

The foregoing description and accompanying drawings have reference to what might be considered to be the preferred or approved form of my invention. I desire it to be understood that I may make such changes in the construction, combination and arrangement of parts, materials, dimensions et cetera, as may prove expedient and fall within the scope of the appended claim.

What is claimed is:—

A garden implement comprising a head having tooth receiving openings formed therein, teeth fitting in the said openings, a handle detachably connected to said head, a carrier bar detachably connected to said head independently of said handle, and provided with a socket, a stem having a reduced end received in said socket, fastening means carried by said bar and engageable with said reduced end, and an earth working blade carried by the opposite end of the stem.

In testimony whereof I affix my signature in presence of two witnesses.

SPRINGS MILLER.

Witnesses:
STELLA M. FREEMAN,
G. A. FREEMAN.